United States Patent [19]

Kondo et al.

[11] Patent Number: 5,604,874
[45] Date of Patent: *Feb. 18, 1997

[54] METHOD FOR CONTROLLING A BUS TO PROGRESS TRANSFER CYCLES WITHOUT INSERTING A CYCLE FOR ACKNOWLEDGMENT

[75] Inventors: Nobukazu Kondo, Ebina; Seiji Kaneko, Yokohama; Hideaki Gemma, Hadano; Tetsuhiko Okada, Hachioji; Kazuhiko Komori, Ebina; Koichi Okazawa, Tokyo, all of Japan

[73] Assignee: Hitachi, Ltd., Tokyo, Japan

[ * ] Notice: The term of this patent shall not extend beyond the expiration date of Pat. No. 5,428,753.

[21] Appl. No.: 480,395

[22] Filed: Jun. 7, 1995

Related U.S. Application Data

[62] Division of Ser. No. 60,055, May 13, 1993, Pat. No. 5,428,753.

[30] Foreign Application Priority Data

May 15, 1992 [JP] Japan .................................. 4-123569

[51] Int. Cl.⁶ ...................................................... G06F 15/16
[52] U.S. Cl. ...................... 395/298; 395/306; 395/200.14
[58] Field of Search ................................... 395/325, 200, 395/285, 298, 306, 200.5, 200.14

[56] References Cited

U.S. PATENT DOCUMENTS

| | | | |
|---|---|---|---|
| 4,232,366 | 11/1980 | Levy et al. ............................ | 395/325 |
| 4,373,183 | 2/1983 | Means et al. ........................... | 395/325 |
| 4,495,573 | 1/1985 | Ballegeer et al. ...................... | 395/325 |
| 4,570,220 | 2/1986 | Tetrick et al. .......................... | 395/325 |
| 5,068,781 | 11/1991 | Gillett, Jr. et al. ..................... | 395/325 |
| 5,191,649 | 3/1993 | Cadambi et al. ....................... | 395/200 |

FOREIGN PATENT DOCUMENTS

| | | |
|---|---|---|
| 6111872 | 1/1986 | Japan . |
| 2159659 | 6/1990 | Japan . |

*Primary Examiner*—Jack B. Harvey
*Assistant Examiner*—Jeffrey K. Seto
*Attorney, Agent, or Firm*—Antonelli, Terry, Stout & Kraus, LLP

[57] ABSTRACT

An information processing system wherein a module to operate as a master which executes a read access to a module to operate as a slave requests a bus arbiter to afford the mastership of a bus with a bus mastership request signal, and it simultaneously asserts a last cycle signal so as to notify the bus arbiter of the fact that the next cycle will be the last cycle to be used by the master. Subsequently, when the master has had the use of the bus granted by a bus use grant signal from the bus arbiter, it transfers an address to the slave by the use of the bus in the next cycle, thereby starting the read access. After the read access, the master releases the bus mastership. Only when the slave has failed to accept the transferred address, does it assert a retry request signal two cycles after the transfer cycle of the address not accepted. In this case, the module having executed the transfer two cycles before the cycle of the asserted signal executes again the transfer executed before. Thus, the address to be transferred can be transferred to the module ready to accept the address, in only one cycle.

42 Claims, 16 Drawing Sheets

METHOD FOR CONTROLLING A BUS TO PROGRESS TRANSFER CYCLES WITHOUT INSERTING A CYCLE FOR ACKNOWLEDGMENT

This application is a 37 CFR §1.60 divisional of prior application Ser. No. 08/060,055 filed May 13, 1993 now U.S. Pat. No. 5,428,753.

BACKGROUND OF THE INVENTION

1. Field of the Invention

The present invention relates to information processing systems such as personal computers and workstations. More particularly, it relates to techniques for controlling the bus of an information processing system.

2. Description of the Related Art

In an information processing system, a plurality of modules connected to a bus transfer data in synchronism with a common clock. A technique for controlling the synchronous bus is known from, for example, the official gazette of Japanese Patent Application Laid-open No. 11872/1986.

Such a prior-art control of the synchronous bus will be explained.

FIG. 16 of the accompanying drawings illustrates the timings of data transfer on the bus according to the synchronous bus controlling technique in the prior art.

Referring to the figure, symbol CLK denotes a synchronous clock for data transfer, which is common to all modules connected to a bus. Symbol A/D denotes an address and data which are multiplexed together. An address valid signal ADRV indicates that the address of the signal A/D is valid. A signal WRITE serves to designate a write access, and it also indicates that the data of the signal A/D is valid. In addition, a wait signal WAIT serves to notify a master side of the fact that a buffer on a slave side is not in a status capable of accepting the data.

In a case where one of the modules is to access another for a write operation by the use of the bus configured of such signal lines, the bus master first asserts the address valid signal ADRV indicating the validity of the address on the line A/D, and it simultaneously delivers the address of the access destination to the line A/D.

On the other hand, the slave module senses that the write access is directed toward itself, on the basis of the decoded result of the address and the designation signal WRITE for the write access. In a case where the slave module is ready for accepting the data, it accepts the valid data on the line A/D at the timing of the synchronous clock CLK. In contrast, in a case where the slave module is not ready for accepting the data, it requests the prolongation of a data cycle by the use of the wait signal WAIT which notifies the master side that it is incapable of accepting the data.

In a case where the wait signal WAIT is asserted, the master module prolongs the data cycle during the assertion. When the slave module is ready to accept the data, it accepts the valid data on the line A/D at the timing of the synchronous clock CLK, and it negates the wait signal WAIT. Upon the negation of the wait signal WAIT, the master module finishes the data cycle and ends the access.

In this manner, according to the prior-art technique for controlling the synchronous bus, the master module transfers the data to the slave module, and during the report to each other whether or not the data transfer is possible, using the wait signal WAIT in handshake fashion.

SUMMARY OF THE INVENTION

With the prior-art technique as stated above, in transferring the data, a wait cycle is inserted in advance of the data transfer. Therefore, an overhead arises in correspondence with the wait cycle, to incur problems that the data transfer rate is lowered and that the utilization factor of the bus is lowered due to an increased bus occupation time period.

It is accordingly an object of the present invention to provide a bus control method in which the utilization factor of a bus can be enhanced by reducing the overhead of data transfer.

In order to accomplish the object, the present invention proposes by way of example a bus control method in an information processing system having a bus, and a plurality of modules connected to the bus, wherein a master which is the module having acquired mastership of the bus controls the bus and transfers an address and data to a slave which is the module being a transfer destination, in synchronism with cycles of a clock which is common to all the modules; comprising the step of allowing a specified one of the modules to acquire the bus mastership and so become master module; the step of allowing the master, having acquired the bus mastership, to execute a transfer cycle for transferring either of the address or the data to the slave, and to thereafter release the bus mastership; the step of allowing the module having received either of the transferred address and data as slave, to send all the other modules an acknowledge report indicating receipt of either of the address or the data, a predetermined number of cycles after the transfer cycle in which either the address or the data is transferred; and the step of allowing the module which executed the transfer as the master the predetermined number of cycles before the cycle in which the acknowledge report is sent, to verify success of the transfer in accordance with the sent acknowledge report.

According to the bus control method of the present invention, when the master has acquired the mastership of the bus, it executes the transfer cycle for transferring the address and the data to the slave, without checking the status of the slave, and it releases the bus mastership without verifying the success or failure of the transfer. On the other hand, the module having received the transferred address and data as the slave sends all the other modules the acknowledge report indicative of the receipt for each transfer cycle concerning the received address or data, the predetermined number of cycles after the corresponding transfer cycle. The module having executed the transfer as the master the predetermined number of cycles before the cycle in which the acknowledge report has been sent, verifies the success or failure of the transfer in the executed transfer cycle in accordance with the sent acknowledge report. Only when the transfer is not successful, is a countermeasure taken.

Accordingly, the transfer to the slave which is ready to accept this transfer from the master can be realized by only the cycle in which the address or data is actually transferred. Thus, the utilization factor of the bus can be enhanced.

DETAILED DESCRIPTION OF THE PREFERRED EMBODIMENTS

Now, an embodiment of an information processing system according to the present invention will be described.

Figure 1:
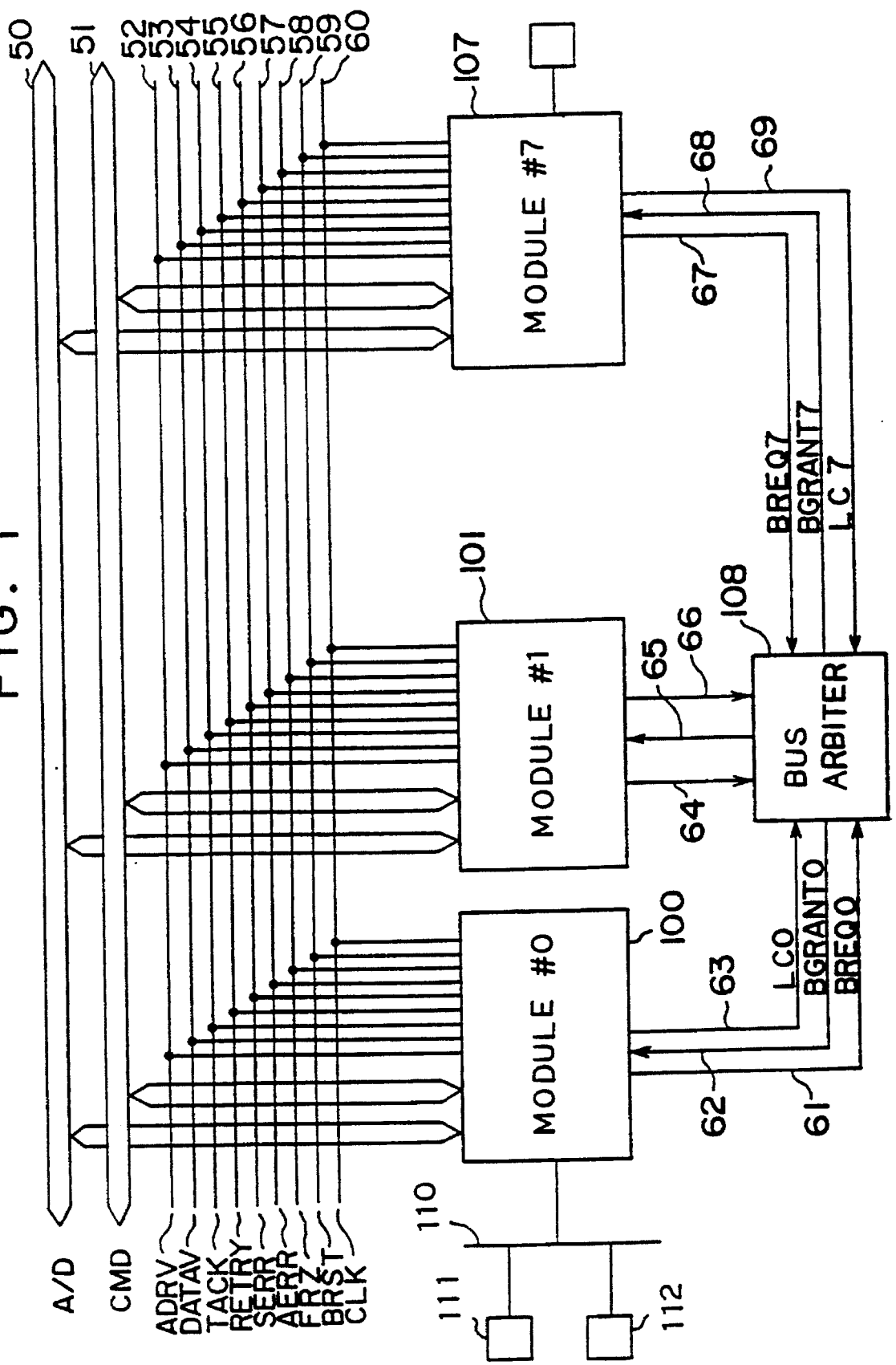
FIG. 1 is a block diagram illustrative of the architecture of an information processing system according to an embodiment of the present invention.

FIG. 1 illustrates the architecture of the information processing system in this embodiment.

As shown in the figure, the information processing system in this embodiment comprises system buses 50–60, a plurality of modules #0–#7 (100–107) which are connected to the system buses 50–60, a bus arbiter 108 which arbitrates a bus mastership among the modules 100–107, an I/O (input/output) bus 110 which is connected to the modules 100–107, and I/O devices 111 and 112 which are connected to the I/O bus 110. In some cases, only one I/O device is connected to the I/O bus 110. Besides, a processor bus to which a CPU (central processing unit) and a memory are connected is connected to at least one of the modules 100–107. Each of the modules 100–107 includes therein a system bus interface device, which mediates the data transfer between the system buses 50–60 and the I/O bus 110 or the I/O device 111 or 112.

Numeral 61 in the figure denotes a bus mastership request signal (BREQ0) with which a request for the bus mastership is made to the bus arbiter 108 by the module #0 (100), numeral 62 a bus use grant signal (BGRANT0) with which the bus arbiter 108 grants the module #0 (100) the use of the system buses 50–60, and numeral 63 a last cycle signal (LC0) with which the module #0 (100) notifies the bus arbiter 108 of the fact that the next cycle is the last cycle in the use of the system buses 50–60. Likewise, numeral 64 denotes a bus mastership request signal (BREQ1) directed from the module #1 (101) to the bus arbiter 108, numeral 65 a bus use grant signal (BGRANT1) directed from the bus arbiter 108 to the module #1 (101), and numeral 66 a last cycle signal (LC1) for reporting the last cycle from the module #1 (101) to the bus arbiter 108. Also, numeral 67 denotes a bus mastership request signal (BREQ7) directed from the module #7 (107) to the bus arbiter 108, numeral 68 a bus use grant signal (BGRANT7) directed from the bus arbiter 108 to the module #7 (107), and numeral 69 a last cycle signal (LC7) for reporting the last cycle from the module #7 (107) to the bus arbiter 108.

Regarding the system buses, the system bus 50 bears an address and data (A/D), and the system bus 51 bears a command signal (CMD) for designating the type of access. The system bus 52 bears an address valid signal (ADRV) indicating that the address on the address and data bus A/D (50) is valid, while the system bus 53 bears a data valid signal (DATAV) indicating that the data on the bus A/D (50) is valid. The system bus 54 bears a transaction acknowledge signal (TACK) with which a slave side notifies a master side of the fact that the address or the data has been correctly received. The system bus 55 bears a retry request signal (RETRY) which is directed from the slave side to the master side. The system bus 56 bears a synchronous error signal ($ERR) being an error report signal which is synchronous with a transaction from the slave side to the master side, while the system bus 57 bears an asynchronous error signal (AERR) being an error report signal which is not synchronous with the transaction. The system bus 58 bears a freeze signal (FRZ) which is output simultaneously with the synchronous error signal SERR (56) or the asynchronous error signal AERR (57) so as to freeze any transaction other than a diagnostic transaction, while the system bus 59 bears a bus reset signal (BRST) which cancels the freeze signal after the information processing system has recovered from an error on the basis of the diagnostic transaction in the freeze operation. The system bus 60 bears a synchronizing clock signal (CLK) which is supplied to all the modules 100–107 in common.

Figure 2:
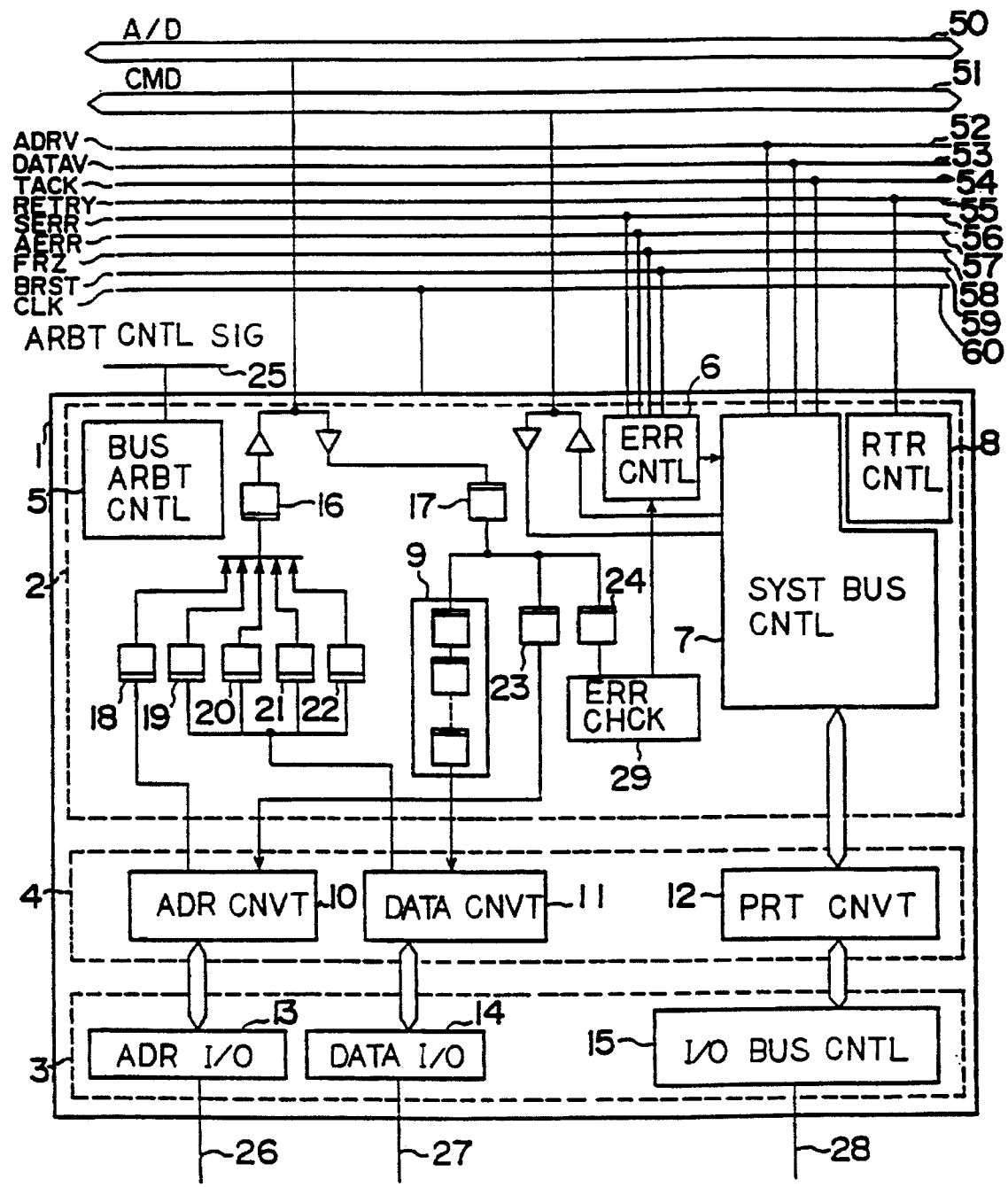
FIG. 2 is a block diagram showing the construction of a system bus interface device.

Next, FIG. 2 illustrates the internal construction of the module which is connected to the I/O bus 110.

Referring to the figure, numeral 1 denotes the aforementioned system bus interface device which takes charge of bus controls, and which is connected between the system buses 50–60 and the I/O bus 110 so as to mediate the data transfer between the module and the I/O device 111 or 112.

Numeral 2 represents a system bus control portion which is provided within the system bus interface device 1, while numeral 3 represents a control portion which controls the I/O bus 110 connected to the system bus interface device 1. Shown at numeral 4 is a conversion portion which matches the interfacing between the system bus control portion 2 and the I/O bus 110 or I/O control portion 3. The system bus control portion 2 includes a bus arbitration controller 5, an error controller 6, a system bus controller 7, a retry controller 8, and a buffer 9 for received data. Further, the control portion 2 includes a final stage buffer 16 for outputs, an initial stage buffer 17 for inputs, an address output buffer 18, data buffers 19–22 for a burst write mode, an input address buffer 23, a buffer 24 for checking an input address and data, and an error checker 29 for detecting a transfer error in accordance with, e.g., the parity of the data. Numeral 25 denotes an arbitration control signal. The conversion portion 4 includes an address converter 10, a data converter 11 and a protocol converter 12. The I/O control portion 3 includes an address I/O unit 13, a data I/O unit 14 and an I/O (bus) controller 15. Numeral 26 denotes an address bus, numeral 27 a data bus, and numeral 28 a control signal.

Incidentally, the module which is connected to the processor bus has a construction similar to the above.

Now, data transfer operations in such an information processing system will be described.

First, a read access operation will be explained. In this embodiment, the read access operation is realized by a start sequence in which a read requesting side delivers an address to the system bus 50, and a response sequence in which a requested side delivers data to the system bus 50 in response to the received address. Besides, in this embodiment, the start sequence and the response sequence realize the read access operation in terms of split operations which are independent of each other.

In this embodiment, in a case where any of the modules 100–107 performs the read access operation, it initially requests the bus arbiter 108 to grant a bus mastership, by the use of the bus mastership request signal (BREQ). At this time, it simultaneously produces the last cycle signal (LC), thereby giving the bus arbiter 108 the previous notice that the bus mastership will be released in one cycle.

Subsequently, when the bus use grant signal (BGRANT) has been asserted, the address etc. are delivered to the system bus 50. Then, the use of the system buses is ended.

Figure 3:
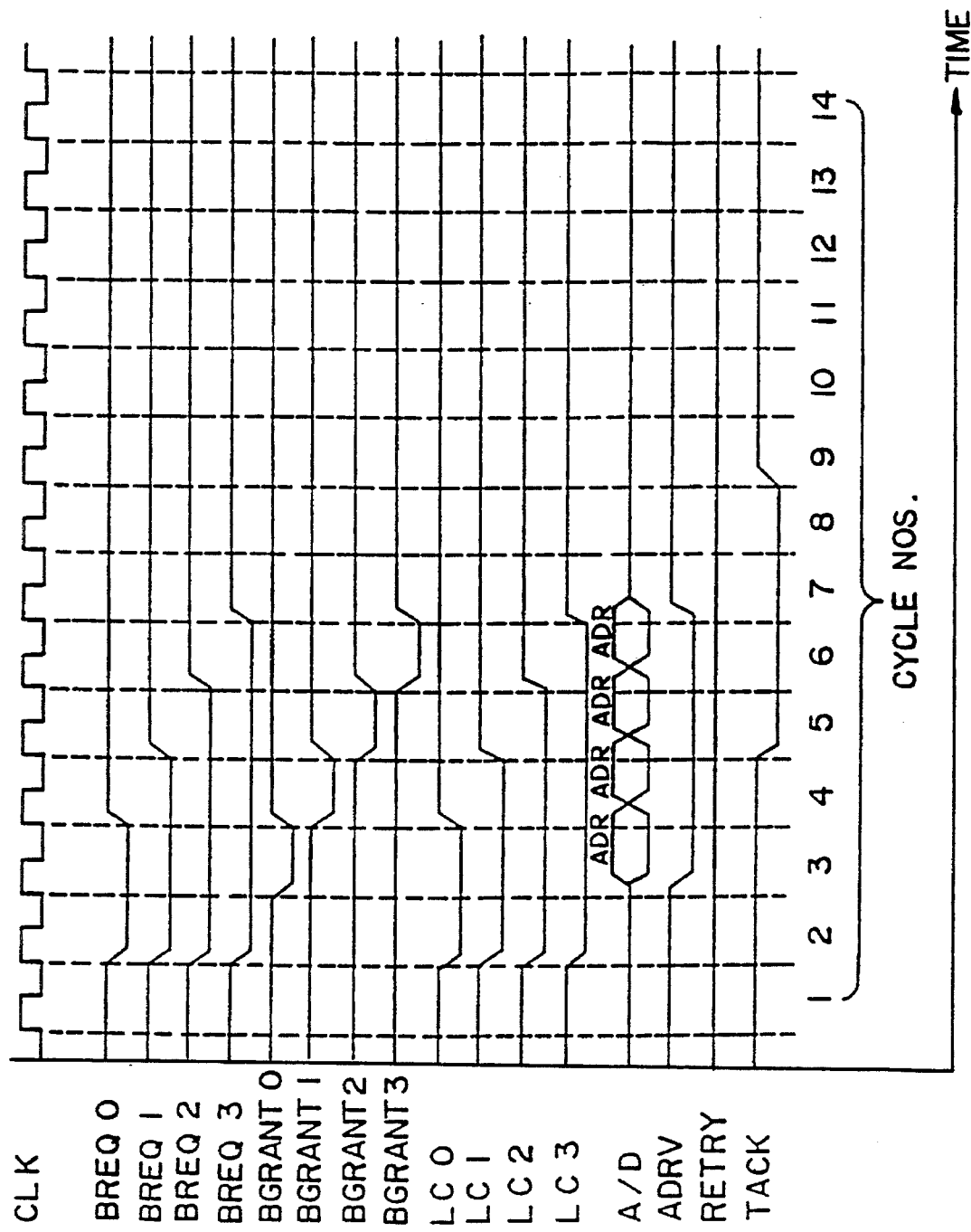
FIG. 3 is a timing chart showing a sequence in the case where bus mastership requests for read accesses have contended.

FIG. 3 illustrates a case where the modules #0 (100) thru #3 (103) have asserted the bus mastership request signals BREQ's for read accesses at the same time.

As shown in the figure, the bus mastership request signals BREQ0–BREQ3 of the respective modules #0 (100)–#3 (103) are simultaneously asserted. Herein, priority levels for the bus use are assumed to be higher in the order of the module #0 (100), module #1 (101), module #2 (102) and module #3 (103).

As seen from the figure, bus masters in the third cycle, fourth cycle, fifth cycle and sixth cycle change-over in the order of the module #0 (100), module #1 (101), module #2 (102) and module #3 (103). Although the bus masters change-over every cycle, no idle cycle is inserted.

Figure 4:
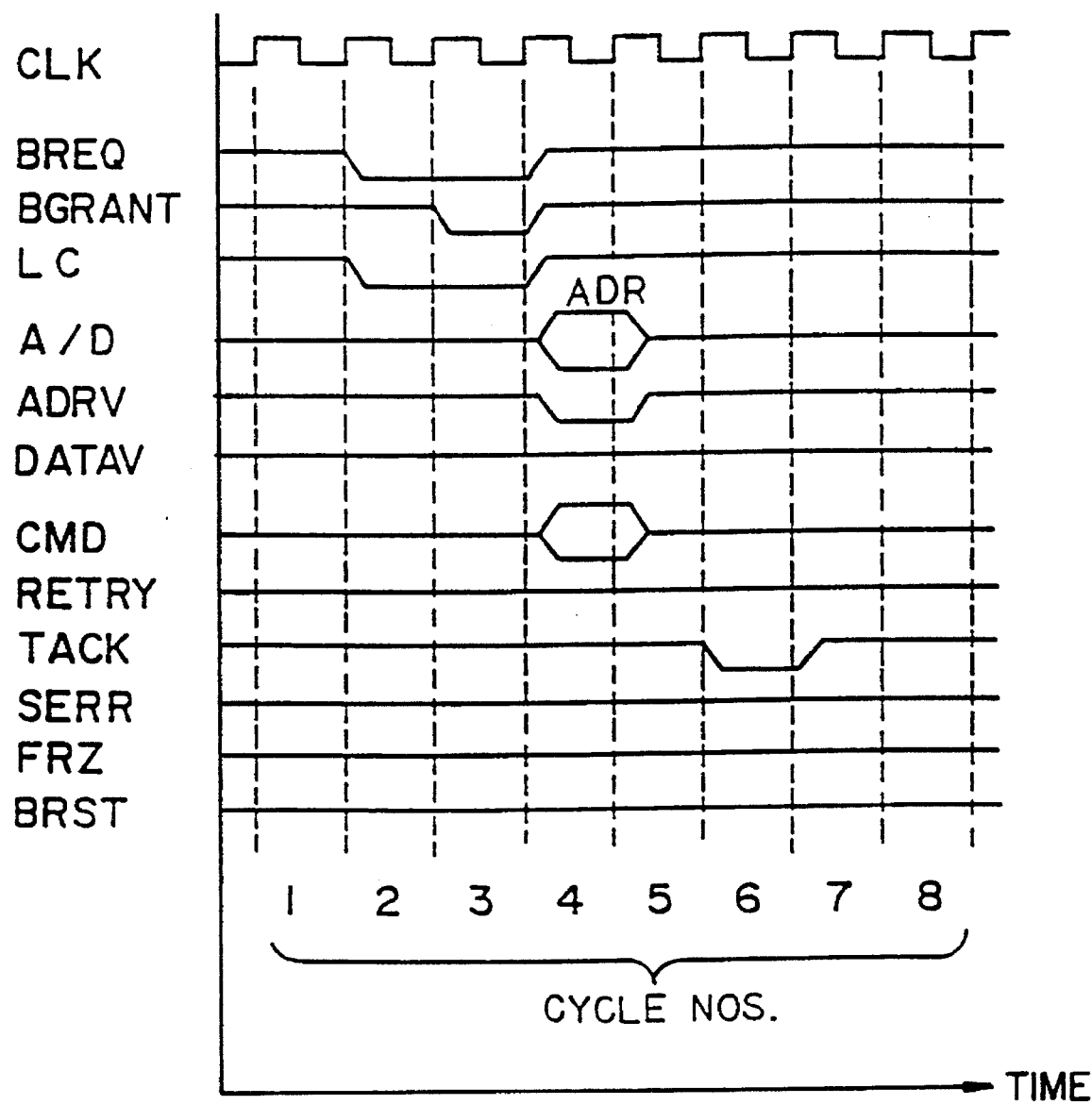
FIG. 4 is a timing chart showing the start sequence of the read access.

FIG. 4 illustrates the sequence in which the read access is started.

As seen from the figure, in this sequence, when the start module having asserted the signals BREQ and LC for the purpose of the read access, receives the bus use grant signal (BGRANT) from the bus arbiter 108, it asserts the address valid signal (ADRV) 52 indicating that the address on the address/data bus A/D is valid, and it delivers the address of an access destination to the address/data bus (A/D) 50. Simultaneously, it delivers the command signal to the bus (CMD) 51 to indicate that the type of access is a read access. Then, the start sequence is ended. Incidentally, the start cycle of the read access is the fourth cycle in the figure.

Figure 5:
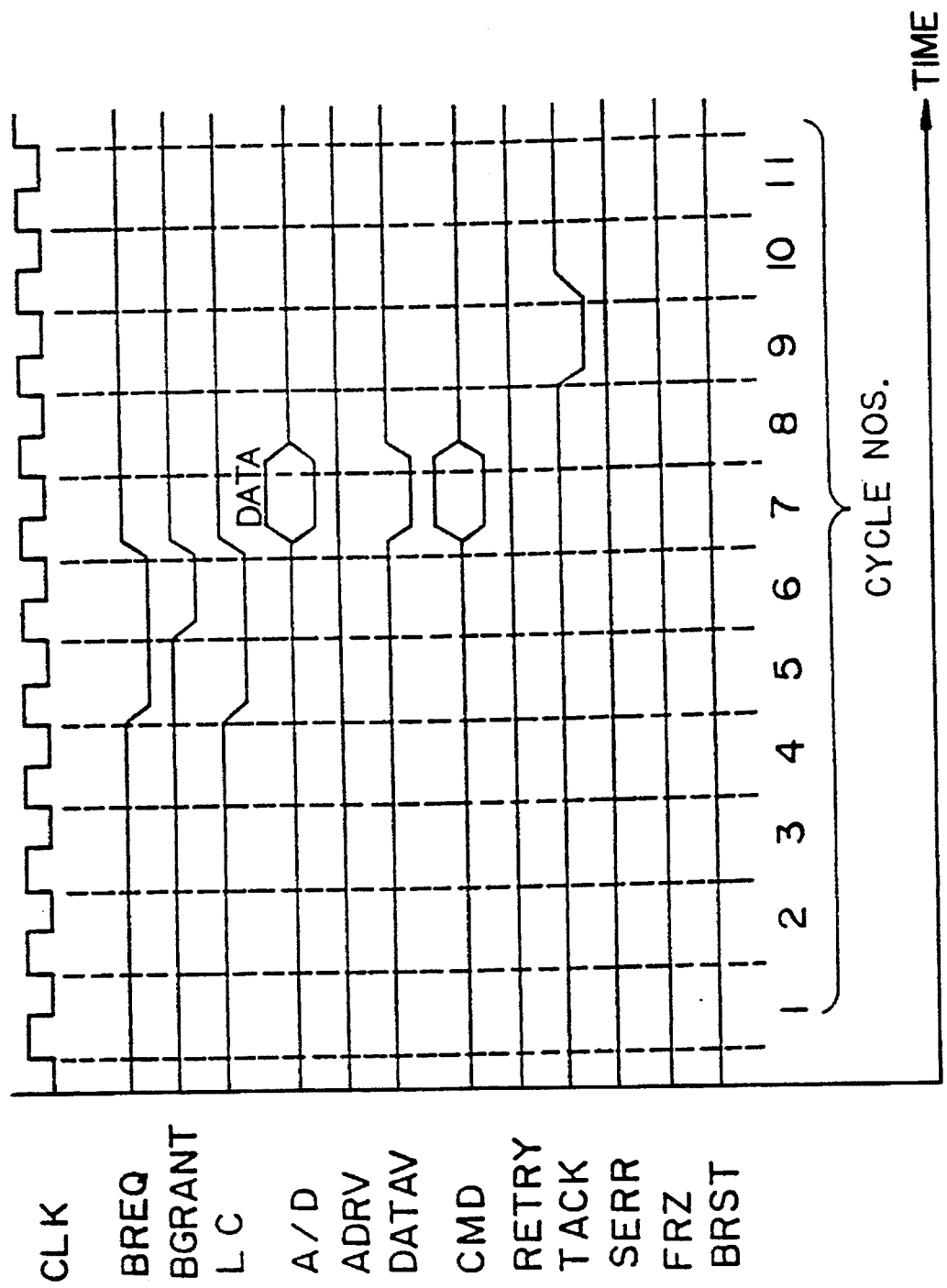
FIG. 5 is a timing chart showing the response sequence of the read access.

Next, the response sequence is shown in FIG. 5.

The module having received the command and address of the read access acquires the bus mastership when it has prepared the response data. Thereafter, it asserts the data valid signal (DATAV) 53 indicating that the data on the address/data bus A/D is valid, and it delivers the response data to the address/data bus (A/D) 50. Simultaneously, it delivers the command signal to the bus (CMD) 51 to indicate that the type of access is a read response access. The response cycle of the read access is the seventh cycle in the figure.

Figure 6:
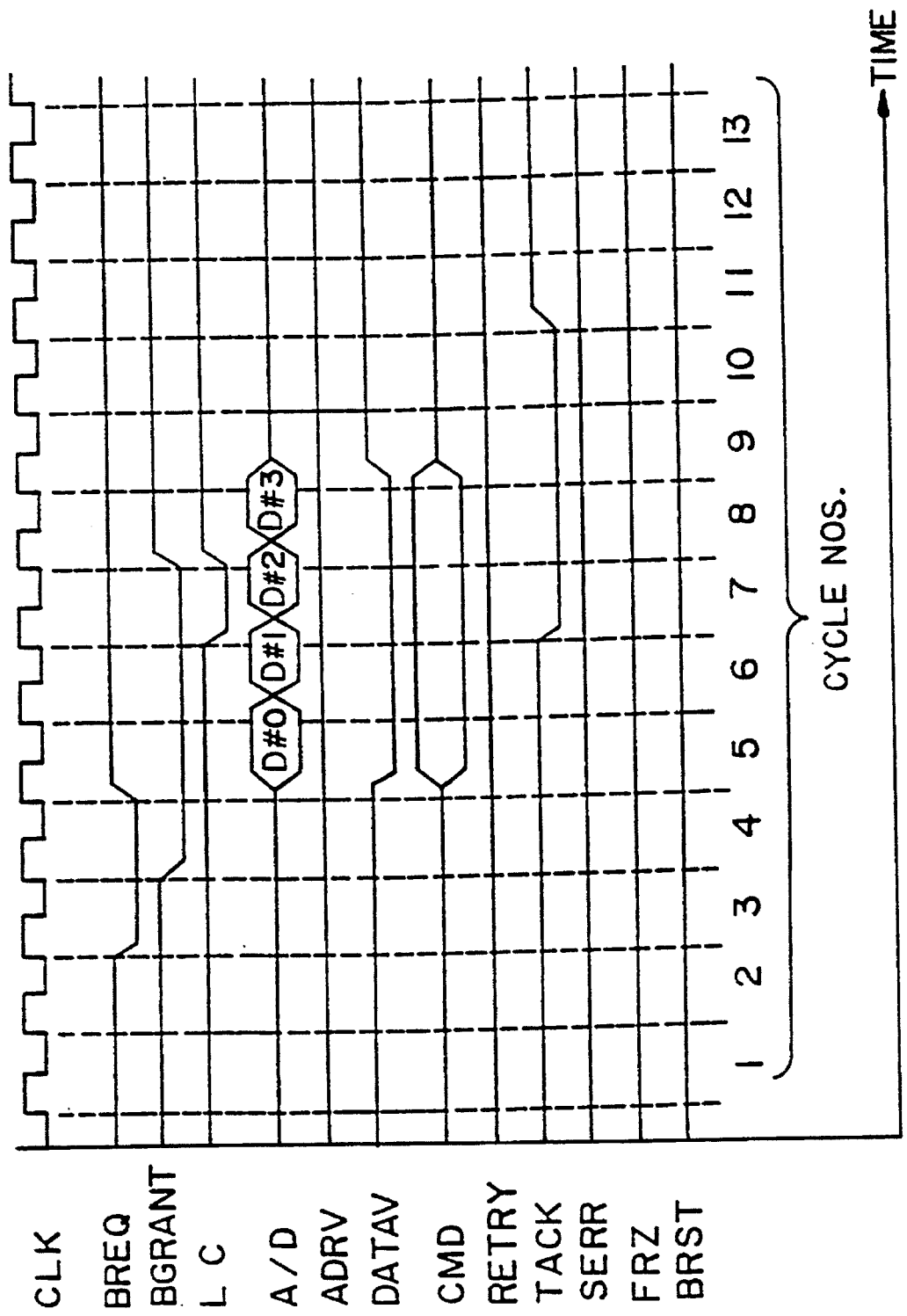
FIG. 6 is a timing chart showing the response sequence of the read access based on burst transfer.

By the way, the response sequence of a read access in a burst read mode is shown in FIG. 6. In the figure, the response cycles of the read access are the fifth–eighth cycles.

As described above, in this embodiment, a wait signal or the like as in the prior art is not employed, and the buffer for received data (9 in FIG. 2) in each module is assumed to be capable of accepting data at any time. After having acquired the bus mastership, the module performs the transfer in one cycle per data item or per address, infallibly. Thus, a time period for the occupation of the bus A/D (the bus 50 for transferring the address and the data) is shortened, and the utilization factor of the bus A/D is enhanced.

Figure 7:
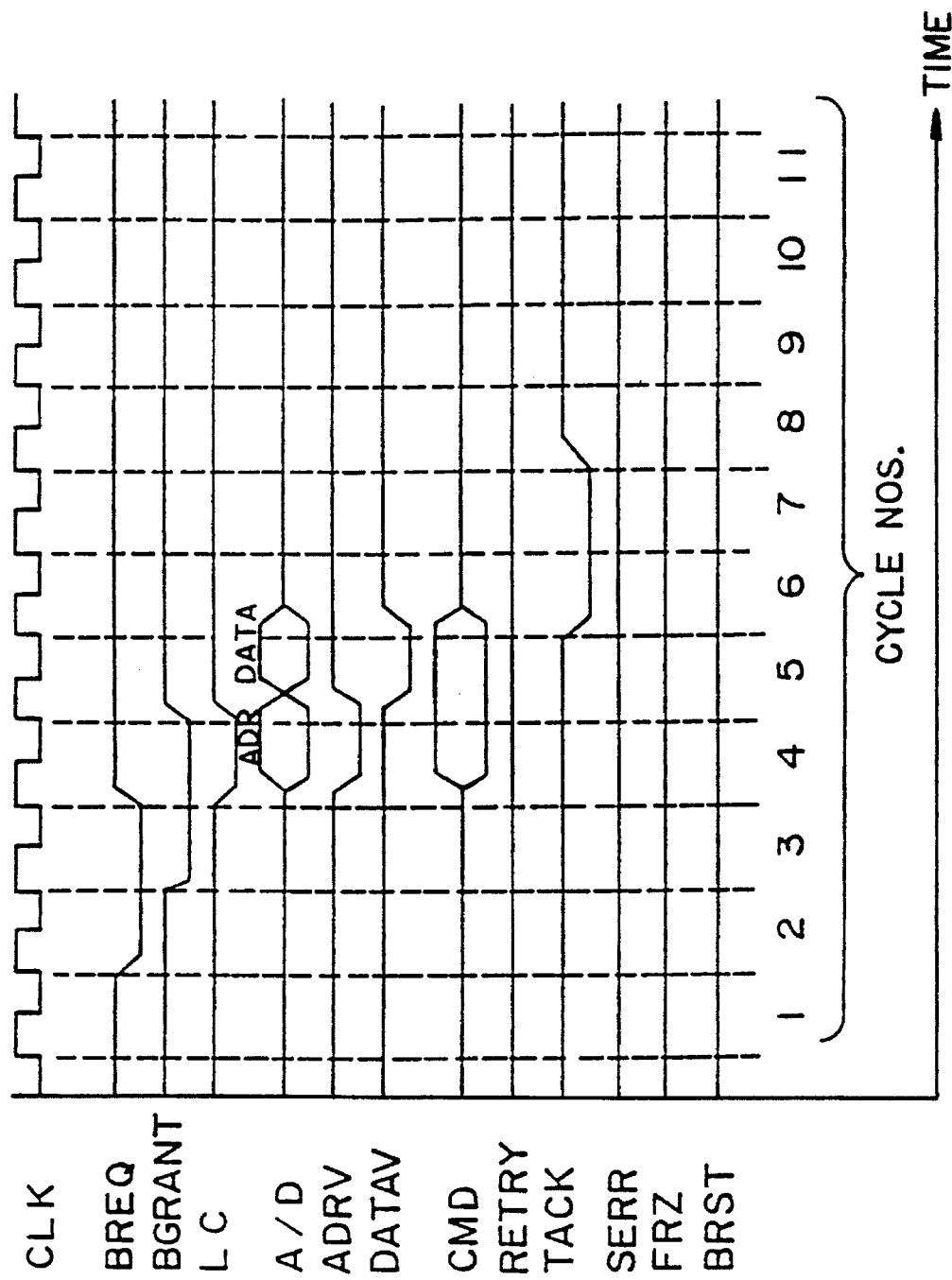
FIG. 7 is a timing chart showing the sequence of a write access.

Also in the sequence of a write access, as shown in FIG. 7, each of address transfer and data transfer can be ended in one cycle. A start cycle in which an address etc. is transferred or delivered to start the write access is the fourth cycle in the figure, while a response cycle in which data etc. are transferred or delivered is the fifth cycle.

Figure 8:
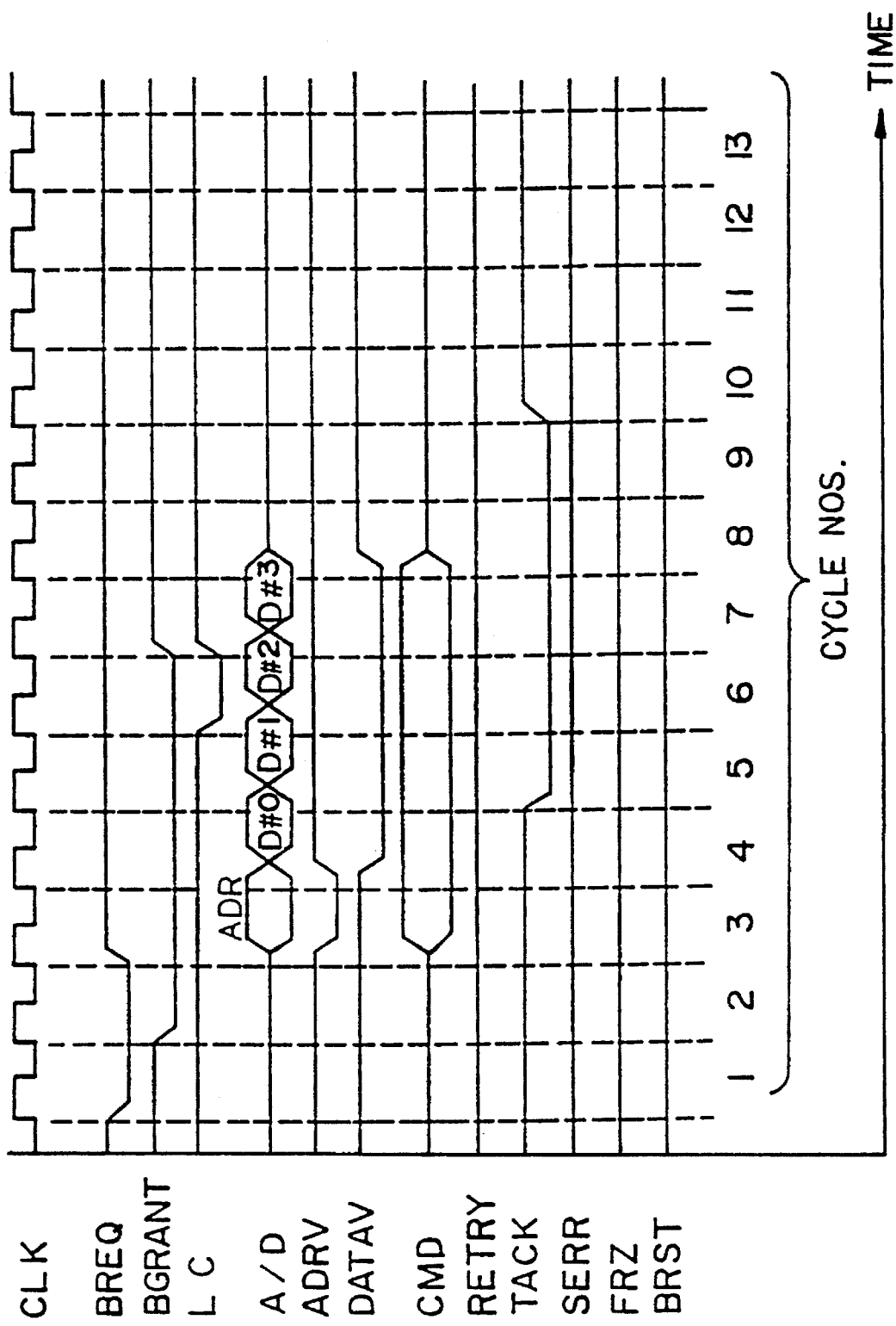
FIG. 8 is a timing chart showing the sequence of the write access based on the burst transfer.

Besides, in the sequence of a write access in a burst write mode, as shown in FIG. 8, the transfer can be performed in one cycle per data item or per address infallibly. In FIG. 8, a start cycle for transferring the address is the third cycle, and response cycles for transferring for data items in response to the start cycle are the fourth–seventh cycles.

As stated before, it is assumed that the received data buffer (9 in FIG. 2) of each module can accept data at any time, and the module having acquired the bus mastership executes the transfer in one cycle per data item or per address, infallibly. The storage capacity of the buffer, however, is actually limited. Accordingly, when write accesses have been performed in succession, the buffer might overflow and fail to accept the data.

In order to avoid such a situation, this embodiment is provided with the transaction acknowledge signal (TACK) 54 with which the slave side notifies the master side of the fact that the address or data has been correctly received, the retry request signal (RETRY) 55 with which the slave side requests the master side to send the address or data again, and the synchronous error signal (SERR) 56 with which the slave side reports the occurrence of an error to the master side in synchronism with a transaction. In addition, these signals are delivered by the slave side infallibly two cycles after the transfer cycle of the master side. Thus, the master side can recognize whether or not the transaction directed therefrom has succeeded.

Besides, each module can discriminate whether or not its buffer will overflow due to the transaction, when subjected to the start of this transaction. Therefore, the retry request signal (RETRY) 55 of the slave side module is asserted for only the head cycle of the transaction. By the way, in the burst write mode or the burst read mode, information on the quantity of burst transfer is contained in the command signal (CMD) 51 in the head cycle of the transaction. Also in this case, accordingly, each module can discriminate whether or not its buffer will overflow due to the transaction, when subjected to the start of this transaction.

Figure 9:
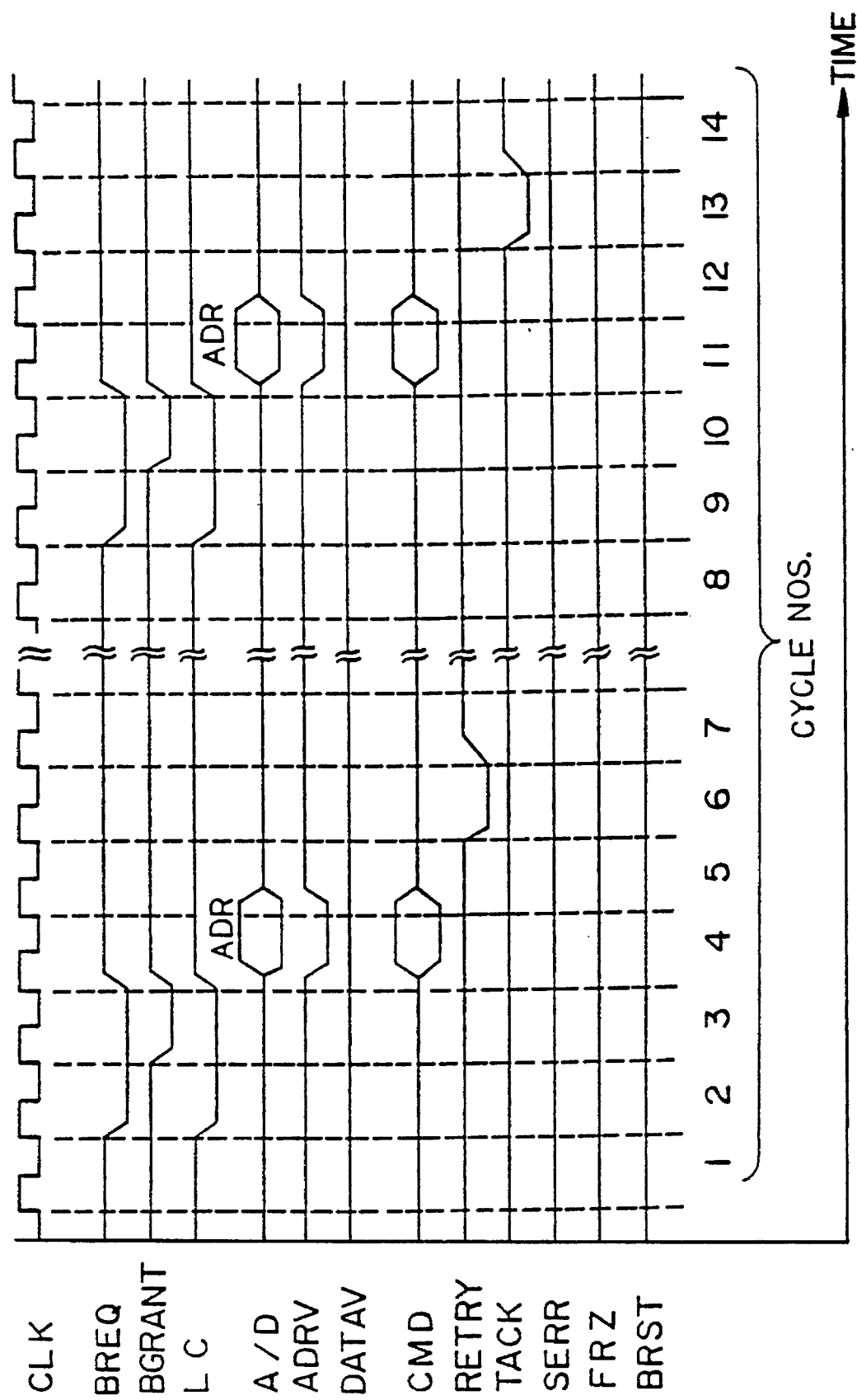
FIG. 9 is a timing chart showing the retry sequence of the read access.

FIG. 9 illustrates an example of the sequence of a retry operation for the read access.

In the illustrated example, the slave asserts the signal (RETRY) 55 in the sixth cycle with respect to the first start cycle (the fourth cycle), and the master responsively executes the second start cycle in the eleventh cycle, thereby succeeding in the retry operation.

Figure 10:
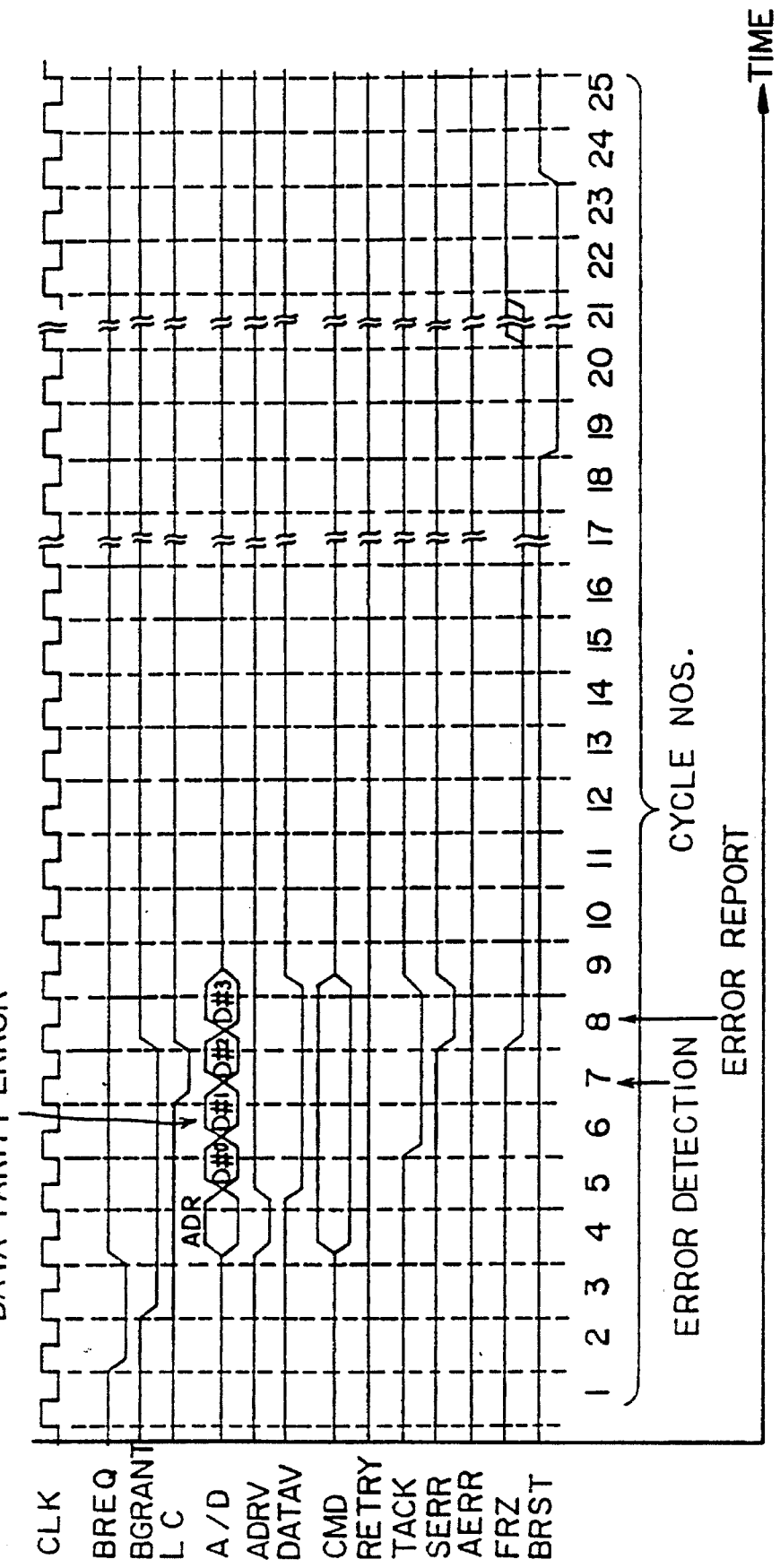
FIG. 10 is a timing chart showing a sequence in the case where a transfer error has developed.

Next, FIG. 10 illustrates an example of a sequence in the case where a transfer error has occurred.

The illustrated example corresponds to the case where a parity error being the transfer error has taken place in the second data transfer cycle (the sixth cycle) of a burst write access. Herein, the synchronous error signal (SERR) 56 which is the error report signal synchronous with the transaction directed from the slave side to the master side is delivered from the slave side (in the eighth cycle) two cycles after the cycle having undergone the parity error. Moreover, the slave side module freezes the bus (A/D) 50 with the freeze signal (FRZ) 58 at the same time as the delivery of the error report signal. On the other hand, when the synchronous error signal (SERR) 56 has been asserted, the master side seeks the cycle of the error occurrence, the address of the error, etc. on the basis of the timing of the assertion of the synchronous error signal (SERR) 56, and stored information on the respective cycles executed in the past. It holds the sought information as logging information.

Besides, when the synchronous error signal (SERR) 56 has been asserted, a predetermined device taking charge of an error recovery process, such as the processor connected to any of the modules, eliminates the error (at any time between the ninth cycle and the eighteenth cycle) on the basis of the logging information, such as the error occurrence cycle and the error address, held by the master side module. Thereafter, the freeze operation is canceled with the bus reset signal (BRST) 59, and the ordinary transaction is restarted (in or after the twenty-fourth cycle).

Thus, in this embodiment, the master side receives the error report which is perfectly synchronous with the transaction. Therefore, it can log even the information indicating the cycle in which the error has developed, so that the subsequent analysis of the error and recovery process for the error can be facilitated.

There will now be explained a transaction of broadcast type in which data is simultaneously written into two or more of the modules (100~107 in FIG. 1) by the use of the system buses (50~60) having the protocol as stated above.

In the broadcast type transaction, the data must be simultaneously written into the plurality of modules. It is accordingly apprehended that any of the plurality of modules will undergo the overflow of the buffer (9 in FIG. 2) and will fail to have the data written thereinto.

This embodiment is therefore contrived so that, in the broadcast mode, the master may always wait for two cycles after the transfer cycle while keeping the bus mastership, thereby checking if the retry request signal (RETRY) 55 or the synchronous error report (SERR) 56 is asserted.

Here, it is possible that the transaction acknowledge signal (TACK) 54, retry request signal (RETRY) 55 and synchronous error report (SERR) 56 will be simultaneously asserted by a plurality of modules. These signals are therefore prepared as "wired OR" signals beforehand. Under this condition, when a retry request has been made, the master executes the same access cycle once more while keeping the bus mastership. On the other hand, each of the slaves having received the transferred data is always caused to wait for two cycles after the data transfer cycle while holding the transferred data without initiating the process thereof, thereby checking if the retry request signal (RETRY) 55 or the synchronous error report (SERR) 56 is asserted by any other slave. On condition that the retry request signal (RETRY) 55 or the synchronous error report (SERR) 56 has been asserted, each slave discards the received data.

Figure 11:
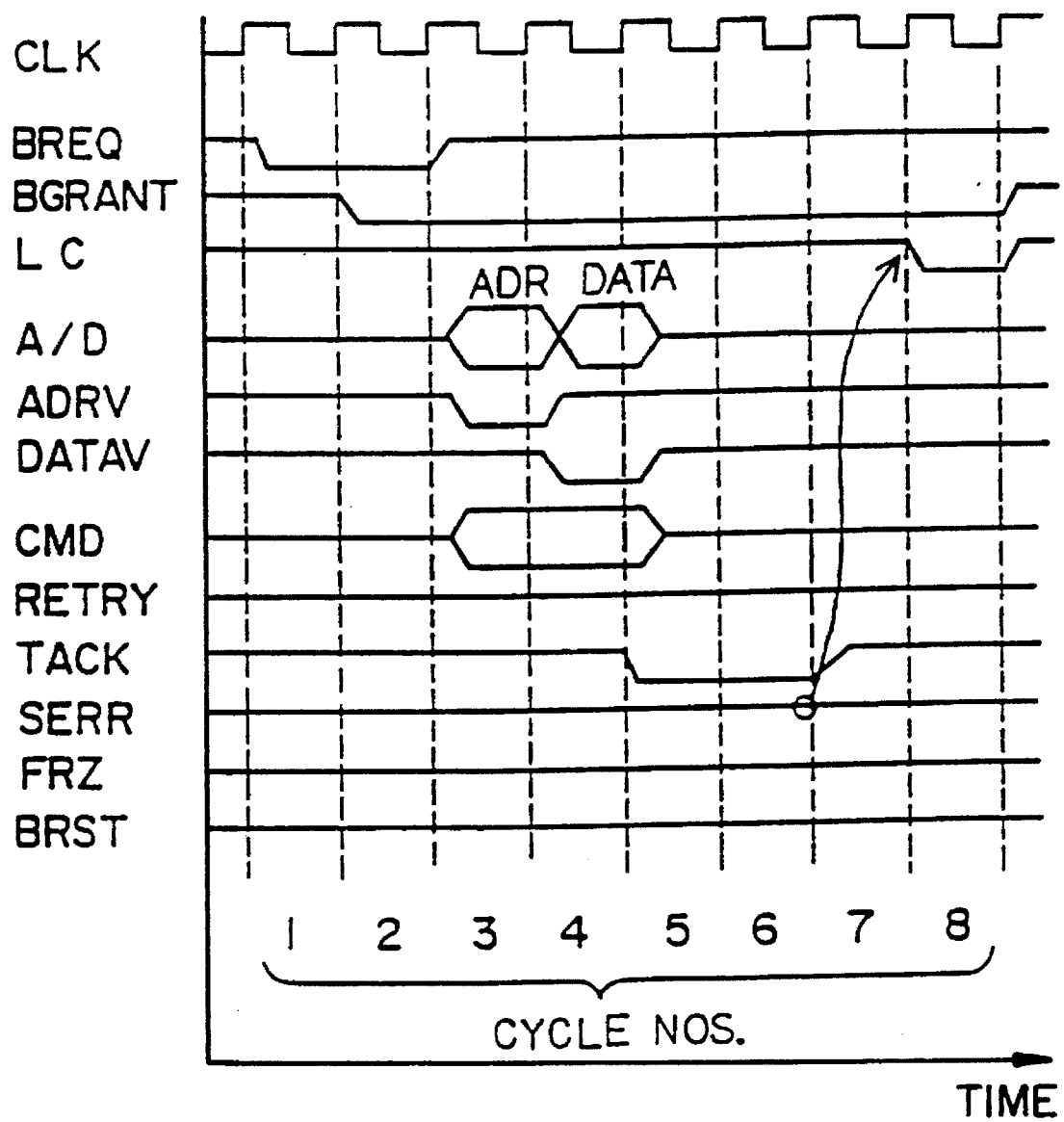
FIG. 11 is a timing chart showing a sequence in a broadcast access mode.
Figure 12:
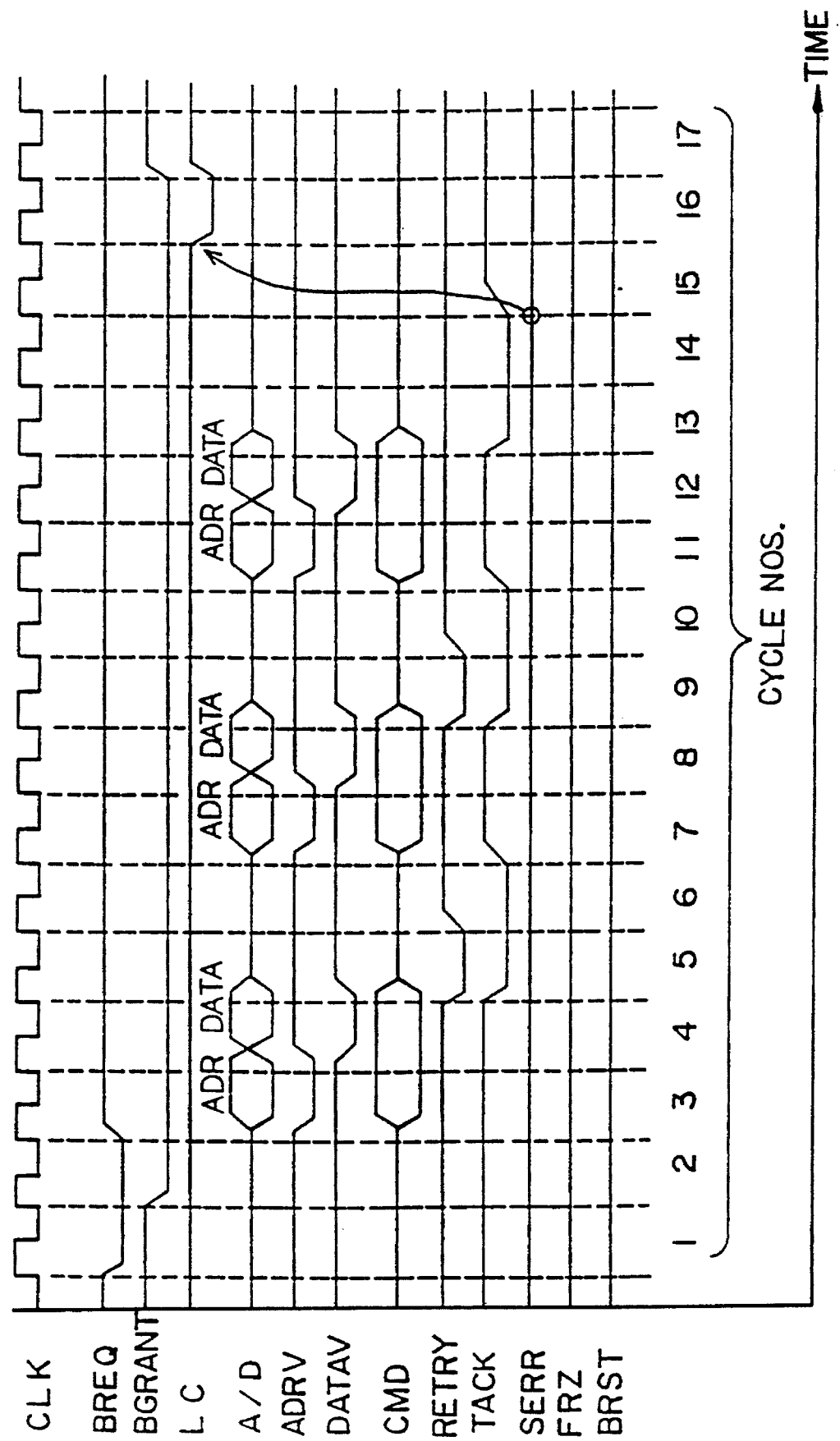
FIG. 12 is a timing chart showing a retry sequence in the broadcast access mode.

Examples of sequences in the broadcast access operation are illustrated in FIGS. 11 and 12.

The example in FIG. 11 corresponds to a case where the data transfer has succeeded with one broadcast access. On the other hand, the example in FIG. 12 corresponds to a case where the data transfer has succeeded with three broadcast accesses.

In the example shown in FIG. 11, the master issues the last cycle signal (LC) and releases the bus mastership on the grounds that, even when it has waited for two cycles after the transfer cycle while keeping the bus mastership, neither the retry request signal (RETRY) 55 nor the synchronous error report ($ERR) 56 is asserted.

In contrast, in the example shown in FIG. 12, the retry request signals (RETRY) 55 are respectively asserted in the fifth and ninth cycles with respect to the broadcast accesses which the master has started in the third and seventh cycles. The master starts the retry operations in the seventh and eleventh cycles in response to the respective asserted signals (RETRY). Regarding the second retry operation, the master verifies that the retry request signal (RETRY) 55 is not asserted in the thirteenth cycle, and that the error report signal (SERR) 56 is not asserted in the fourteenth cycle being two cycles after the last transfer cycle, either. Then, the master issues the last cycle signal (LC) and releases the bus mastership, thereby ending the transaction.

Figure 13:
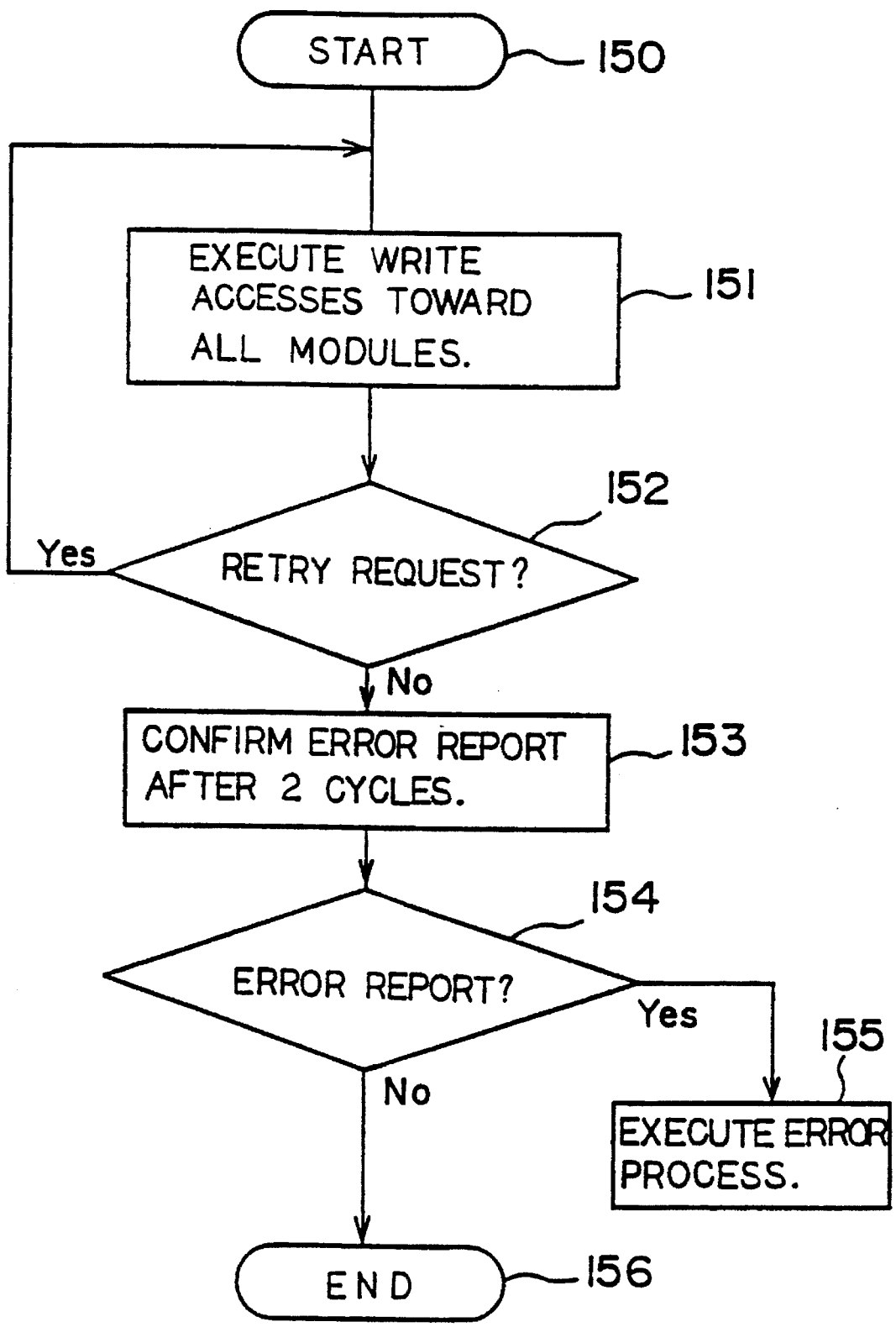
FIG. 13 is a flow chart showing steps which a master runs in the broadcast access mode.

Here, the steps which the master executes for the broadcast access will be explained with reference to FIG. 13. As indicated in the figure, the master starts the broadcast access process at the step 150 and thereafter executes the broadcast type write access toward all the modules except the master itself at the step 151. At the step 152, the master decides if the retry request is made for the step 151. Subject to the retry request, the routine returns to the step 151, at which the broadcast type write access toward all the slave modules is executed again. When it has been decided at the step 152 that the retry request is not made for the step 151, the master waits for two cycles at the step 153 so as to check if all the slaves have received data without any error. When the master has received the error report at the step 154, the routine branches to the step 155 for the error process, and when not, the routine is ended at the step 156.

By the way, in a case where the module which is submitted to successive write accesses is a bus converter for the protocol conversion between buses of different hierarchies, it verifies that the buffer thereof has accepted all data items up to the last cycle from one of the buses, whereupon it starts transfer to the other bus.

Figure 14:
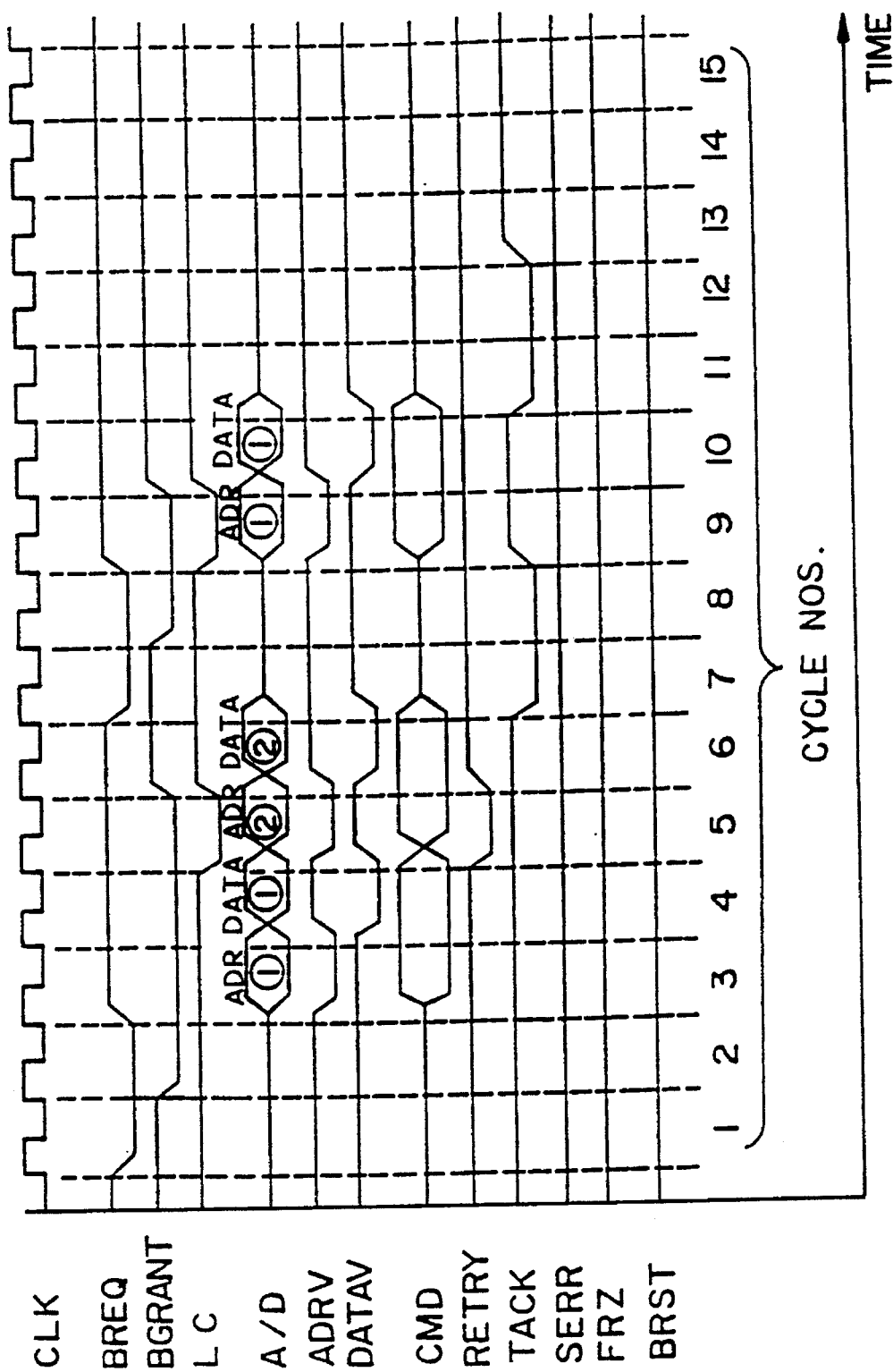
FIG. 14 is a timing chart showing a retry sequence in the case of successive write accesses which are similar to the ordinary write accesses.

Meanwhile, as stated before, the cycle in which the retry request is responsively received is two cycles after the start cycle. Therefore, in a case as shown in FIG. 14 where the same module performs write accesses (started in the third and fifth cycles) to a specified one of the other modules successively, the second write access is performed consecutive to the first write access by the master side even when the first write access has not been accepted on account of the condition of the bus interface device (1 in FIG. 2) of the specified module, for example, the overflow of the buffer (9). On that occasion, only the second write access might be accepted. In other words, the sequence of the accesses is not always guaranteed.

In order to avoid the above drawback, this embodiment is contrived as follows: In such a case where the successive write accesses are performed from the same module to the specified module, the bus interface device to start the successive write accesses always waits for two cycles after the end of each write access so as to verify that a retry request is not received, and it thereafter starts the next write access.

Figure 15:
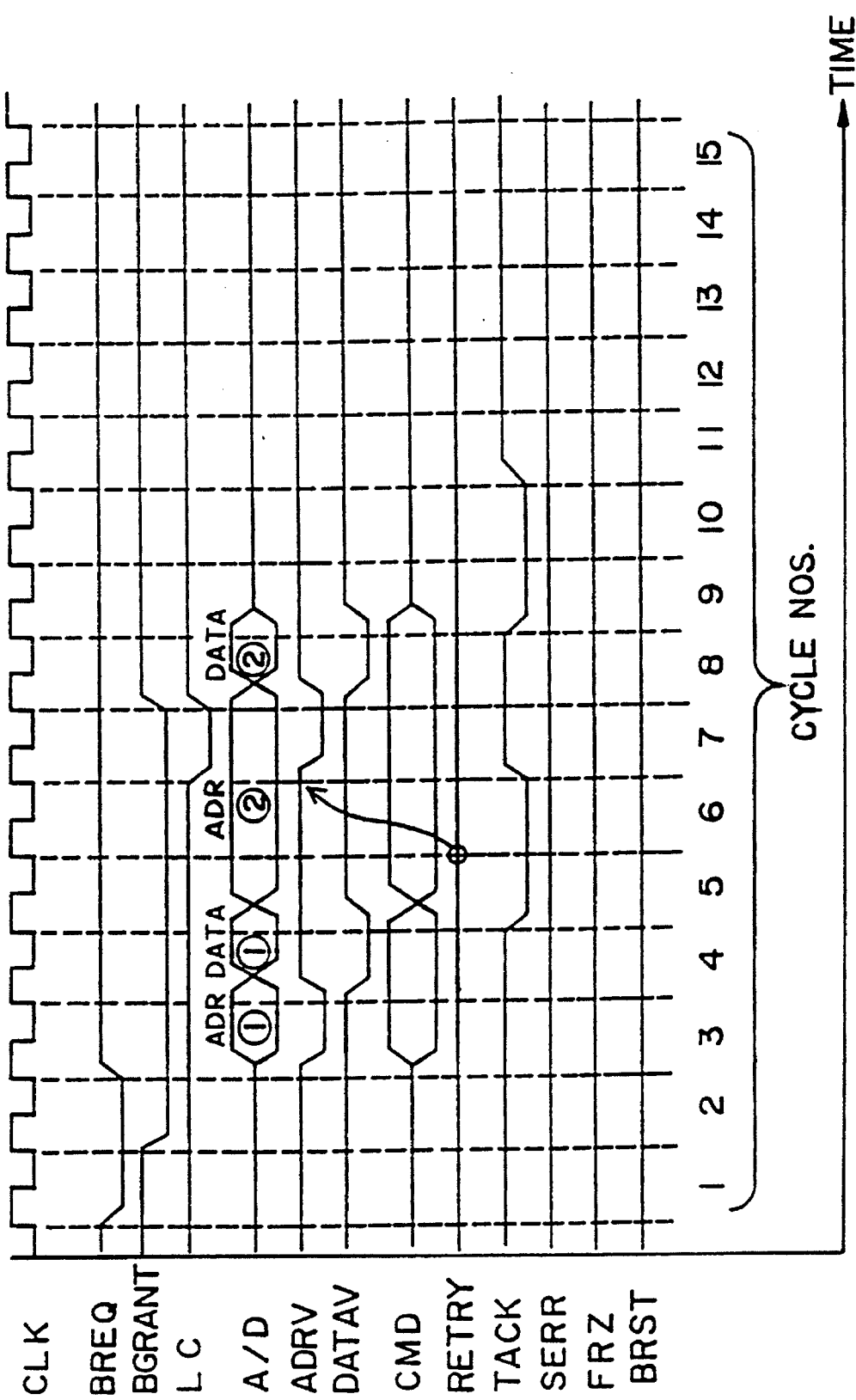
FIG. 15 is a timing chart showing the sequence of the successive write accesses.
Figure 16:
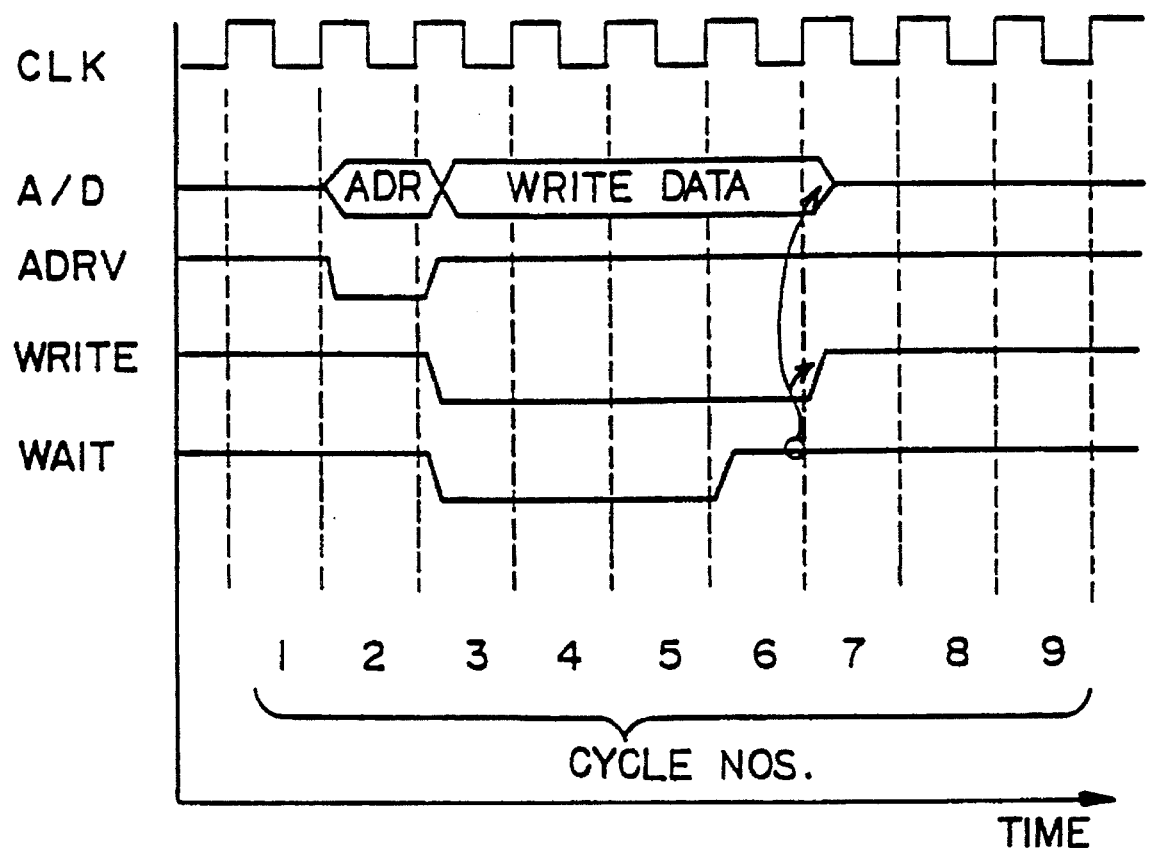
FIG. 16 is a timing chart showing the sequence of a write access based on a bus controlling technique in the prior art.

FIG. 15 illustrates an example of a sequence in the case where the successive write accesses are performed from the same module to the specified module.

In the illustrated example, after the master has ended the first write access in the fourth cycle, it verifies that the retry request signal (RETRY) is not asserted in the fifth cycle. Thereafter, it starts the second access in the seventh cycle.

In this embodiment, each of the retry request, the transaction acknowledge and the error report is made two cycles after the transfer cycle. The reason therefor is that the error checker (29 in FIG. 2), etc. are not directly connected to the system buses (50–60 in FIG. 1) with the intention of lightening the loads of the system buses to the utmost, thereby making it possible to increase the frequency of the signal CLK which is the synchronizing clock of the transfer.

As thus far described, according to the information processing system in this embodiment, the master module does not perform handshaking such as a ready control for verifying the propriety of the receipt of data by the slave module, and the data transfer source ends the transfer cycle without checking the acknowledge signal of the slave which is the transfer destination. It is therefore possible to enhance the utilization factor of the bus (A/D), and to raise the rate of access.

Moreover, regarding the error process, the error report is sent in synchronism with the cycle of the corresponding transaction. Therefore, the master module having received the error report can log detailed information while tracing back to the cycle in which the error has occurred, and the recovery process after the error occurrence can be facilitated.

As set forth above, the present invention can provide a bus control method in which the utilization factor of a bus can be enhanced by reducing the overhead of data transfer.

What is claimed is:

1. An information processing system comprising:

a bus;

a plurality of modules connected to the bus; and an acknowledge bus line, separate from the bus, to be used for transmitting an acknowledge report, said acknowledge bus line being connected to said plurality of modules; wherein a master module which has acquired bus mastership control a sequence in which said master module executes a transfer cycle for transferring either of an address or data to a slave module of a transfer destination, and said master module releases said bus mastership after said transfer cycle and before a transference of the acknowledge report for said transfer cycle from said slave module;

said slave module which had received either of the transferred address or data as said slave, controlling a sequence in which said slave module sends said acknowledge bus line an acknowledge report for indicating receipt of either of said address or said data, a predetermined number of cycles after said transfer cycle having transferred either of said address or said data therein; and said master module which had executed a transfer cycle as said master, then controlling a sequence in which said master module verifies success of the transfer in said transfer cycle having been executed, depending upon if said acknowledge report has been received said predetermined number of cycles after said transfer cycle.

2. An information processing system as claimed in claim 1, wherein said plurality of modules connected to said bus includes an interface circuit for said bus and a control logical unit for controlling said bus.

3. An information processing system as claimed in claim 1, wherein at least one processor is connected to said bus as said module.

4. An information processing system as claimed in claim 1, wherein at least one of said modules is a processor bus bridge (adapter) which conducts a protocol conversion between a protocol of a processor bus to which at least one processor is connected and a protocol of said bus.

5. An information processing system as claimed in claim 1, wherein at least one of said modules is an I/O bus bridge (adapter) which conducts a protocol conversion between a protocol of an I/O bus to which an I/O device is connected and a protocol of said bus.

6. An information processing system as claimed in claim 1, wherein at least one of said modules is a memory interface module which is connected to a memory device via a memory bus.

7. An information processing system as claimed in claim 1, wherein said bus transfers said address and data in a multiplexed system.

8. An information processing system as claimed in claim 1, wherein said cycles are defined by timings of edges of a signal indicating said clock which is common to all the modules.

9. An information processing system as claimed in claim 1, wherein each of said cycles having a same time period are defined by timings of edges of a signal indicating said clock which is common to all the modules.

10. An information processing system as claimed in claim 1, wherein each one of said cycles corresponds to a cycle of said clock which is common to all the modules.

11. An information processing system as claimed in claim 1, wherein said module having received either of the transferred address or data as said slave, sends said acknowledge bus line said acknowledge report, at a cycle later than a second cycle counted from a start of said transfer cycle.

12. An information processing system as claimed in claim 1, wherein said module having received either of the transferred address or data as said slave, sends said acknowledge bus line said acknowledge report, oaf a third cycle counted from a start of said transfer cycle or a cycle later than said third cycle.

13. An information processing system as claimed in claim 1, wherein said module having received either of the transferred address or data as said slave, sends said acknowledge bus line said acknowledge report, at a cycle later than a cycle next to said transfer cycle in which either said address or said data has been transferred.

14. An information processing system as claimed in claim 1, wherein said module having received either of the transferred address or data as said slave, sends said acknowledge bus line said acknowledge report, at a second cycle from an end of said transfer cycle in which either said address or said data has been transferred.

15. An information processing system comprising:

a bus;

a plurality of modules connected to said bus; and a retry request bus line, separate from said bus, to be used for transmitting a retry request, said retry request bus line being connected to said plurality of modules;

wherein a master module which had acquired a bus mastership controls a sequence in which said master module executes a transfer cycle for transferring either of an address or data to a slave module of a transfer destination, and said master module releases said bus mastership after said transfer cycle and before a transference of a retry request for said transfer cycle from said slave module;

said slave module which failed to receive either of the transferred address or data as said slave, controlling a sequence in which said slave module sends on said retry request bus line a retry request for asking for re-execution of the transfer, a predetermined number of cycles after said transfer cycle; and said master module which had executed a transfer cycle as said master controlling a sequence in which said master module retries said transfer in said transfer cycle having been executed, depending upon if said retry request has been received said predetermined number of cycles after said transfer cycle.

16. An information processing system as claimed in claim 15, wherein said plurality of modules connected to said bus includes an interface circuit for said bus and a control logical unit for controlling said bus.

17. An information processing system as claimed in claim 15, wherein at least one processor is connected to said bus as said module.

18. An information processing system as claimed in claim 15, wherein at least one of said modules is a processor bus bridge (adapter) which conducts a protocol conversion between a protocol of a processor bus to which at least one processor is connected and a protocol of said bus.

19. An information processing system as claimed in claim 15, wherein at least one of said modules is an I/O bus bridge (adapter) which conducts a protocol conversion between a protocol of an I/O bus to which an I/O device is connected and a protocol of said bus.

20. An information processing system as claimed in claim 15, wherein at least one of said modules is a memory interface module which is connected to a memory device via a memory bus.

21. An information processing system as claimed in claim 15, wherein said bus transfers said address and data in a multiplexed system.

22. An information processing system as claimed in claim 15, wherein said cycles are defined by timings of edges of a signal indicating said clock which is common to all the modules.

23. An information processing system as claimed in claim 15, wherein each of said cycles having a same time period are defined by timings of edges of a signal indicating said clock which is common to all the modules.

24. An information processing system as claimed in claim 15, wherein each one of said cycles corresponds to a cycle of said clock which is common to all the modules.

25. An information processing system as claimed in claim 15, wherein said module having received either of the transferred address or data as said slave, sends said retry request bus line said retry request, at a cycle later than a second cycle counted from a start of said transfer cycle.

26. An information processing system as claimed in claim 15, wherein said module having received either of the transferred address or data as said slave, sends said retry request bus line said retry request, at a third cycle counted from a start of said transfer cycle or a cycle later than said third cycle.

27. An information processing system as claimed in claim 15, wherein said module having received either of the transferred address or data as said slave, sends said retry request bus line said retry request, at a cycle later than a cycle next to said transfer cycle in which either said address or said data has been transferred.

28. An information processing system as claimed in claim 15, wherein said module having received either of the transferred address or data as said slave, sends said retry request bus line said retry request, at a second cycle from an end of said transfer cycle in which either said address or said data has been transferred.

29. An information processing system having a bus, a plurality of modules connected to the bus, and an error report bus line separate from the bus to be used for transmitting an error report, said error report bus line being connected to said plurality of modules, said system comprising:

a master module which acquires bus mastership controlling a sequence in which said master module executes as a master a transfer cycle for transferring either of an address or data to a slave module of a transfer destination, and releases said bus mastership after said transfer cycle and before a transference of an error report for said transfer cycle from said slave module;

a slave module which receives either of the transferred address or data as said slave, controls a sequence in which said slave module sends on said error report bus line the error report for indicating occurrence of a transfer error a predetermined number of cycles after said transfer cycle in a case where said transfer error is involved in either of the received address or data; and said master module which had executed a transfer cycle as said master controls a sequence in which said master module recognizes said occurrence of said transfer error in said transfer cycle, depending upon if said error report has been received said predetermined number of cycles after said transfer cycle.

30. An information processing system as claimed in claim 29, wherein said plurality of modules connected to said bus includes an interface circuit for said bus and a control logical unit for controlling said bus.

31. An information processing system as claimed in claim 29, wherein at least one processor is connected to said bus as said module.

32. An information processing system as claimed in claim 29, wherein at least one of said modules is a processor bus bridge (adapter) which conducts a protocol conversion between a protocol of a processor bus to which at least one processor is connected and a protocol of said bus.

33. An information processing system as claimed in claim 29, wherein at least one of said modules is an I/O bus bridge (adapter) which conducts a protocol conversion between a protocol of an I/O bus to which an I/O device is connected and a protocol of said bus.

34. An information processing system as claimed in claim 29, wherein at least one said modules is a memory interface module which is connected to a memory device via a memory bus.

35. An information processing system as claimed in claim 29, wherein said bus transfers said address and data in a multiplexed system.

36. An information processing system as claimed in claim 29, wherein said cycles are defined by timings of edges of a signal indicating said clock which is common to all the modules.

37. An information processing system as claimed in claim 29, wherein each of said cycles having a same time period are defined by timings of edges of a signal indicating said clock which is common to all the modules.

38. An information processing system as claimed in claim 29, wherein each one of said cycles corresponds to a cycle of said clock which is common to all the modules.

39. An information processing system as claimed in claim 29, wherein said module having received either of the transferred address or data as said slave, sends said error report bus line said error report, at a cycle later than a second cycle counted from a start of said transfer cycle.

40. An information processing system as claimed in claim 29, wherein said module having received either of the transferred address or data as said slave, sends said error report bus line said error report, at a third cycle counted frown a start of said transfer cycle or a cycle later than said third cycle.

41. An information processing system as claimed in claim 29, wherein said module having received either of the transferred address or data as said slave, sends said error report bus line said error report, at a cycle later than a cycle next to said transfer cycle in which either said address or said data has been transferred.

42. An information processing system as claimed in claim 29, wherein said module having received either of the transferred address or data as said slave, sends said error report bus line said error report, at a second cycle from an end of said transfer cycle in which either said address or said data has been transferred.

* * * * *